Jan. 29, 1924. 1,481,892
A. E. FALOR
METHOD AND APPARATUS FOR VULCANIZING ANNULAR TUBES
Filed Feb. 13, 1922
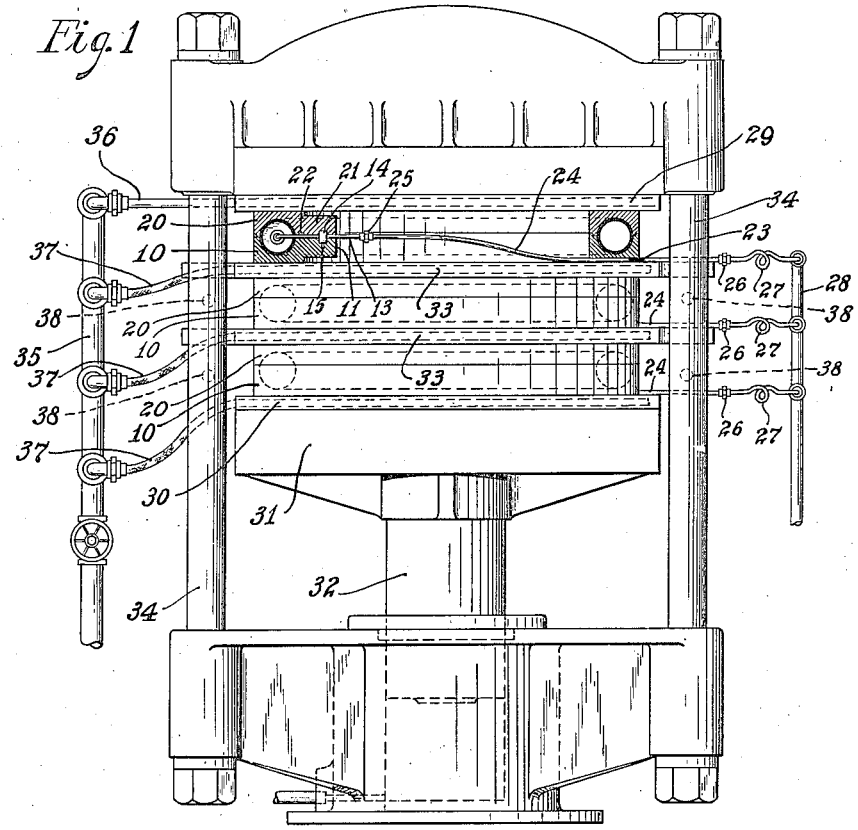
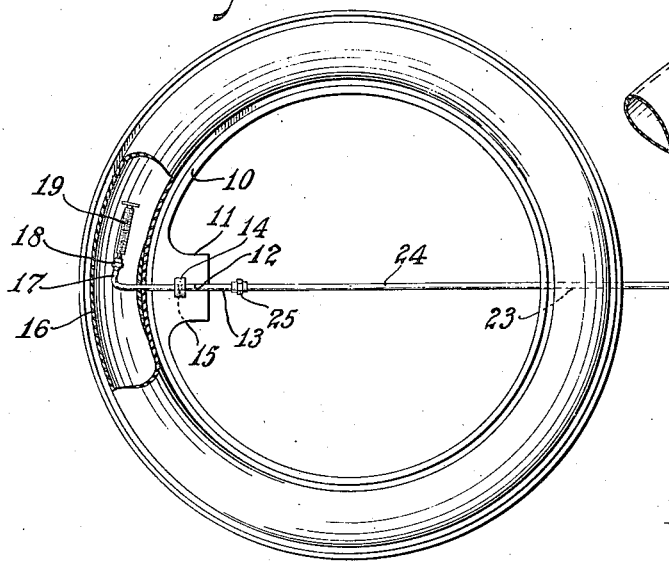
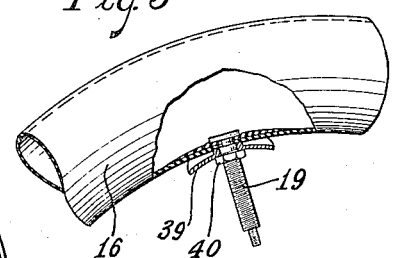
Inventor
Abram E. Falor.
By Robert M. Pierson
Atty.

Patented Jan. 29, 1924.

1,481,892

UNITED STATES PATENT OFFICE.

ABRAM E. FALOR, OF AKRON, OHIO, ASSIGNOR TO THE B. F. GOODRICH COMPANY, OL NEW YORK, N. Y., A CORPORATION OF NEW YORK.

METHOD AND APPARATUS FOR VULCANIZING ANNULAR TUBES.

Application filed February 13, 1922. Serial No. 536,172. REISSUED

*To all whom it may concern:*

Be it known that I, ABRAM E. FALOR, a citizen of the United States, residing at Akron, in the county of Summit and State of Ohio, have invented a certain new and useful Method and Apparatus for Vulcanizing Annular Tubes, of which the following is a specification.

This invention relates to methods and apparatus for vulcanizing annular rubber tubes. In the case of inner tubes for pneumatic tires, for example, when vulcanized in annular form the raw tube is placed in a two-part mold, against the walls of which it is expanded by internal fluid pressure. Such internal pressure has been provided in various ways, but certain disadvantages have attended the several methods. If the internal pressure is provided by sealing water in the tube before enclosing the latter in the mold, to be converted into steam by the application of heat through the mold walls, excessive time is required for the pressure to build up within the tube. If compressed air is injected, substantially all of the vulcanizing heat must reach the tube through the walls of the mold, and this requires considerable time. If steam is injected, as has heretofore been proposed, through the valve-stem of the tube, the latter being mounted in its final position in the wall of the tube, the tube is quickly heated from within by the injected steam, but the vulcanization of the tube is not uniform because the incoming jet of steam impinges on the wall of the tube opposite the valve stem and over-cures the stock at that locality.

My chief objects are to provide a method whereby an annular rubber tube may be quickly vulcanized under the internal pressure of an injected fluid such as steam without local overcuring or "scorching" of the stock, and to provide apparatus suitable for carrying out said method.

Of the accompanying drawings:

Fig. 1 is a side elevation, partly in section of apparatus embodying and adapted to carry out my invention, said apparatus comprising a multiple hot-plate vulcanizing press and a plurality of tube molds therein.

Fig. 2 is a plan view, with parts broken away and in section, of a lower mold section with an inner tube therein.

Fig. 3 is a perspective view of a part of an inner tube, with parts broken away and in section, showing the tubular valve stem or casing in its final relation to the body of the tube.

Referring to the drawings, 10 is the lower section of a two-part inner-tube mold formed with a projection 11 extending from its inner periphery, said projection being formed with a radial groove 12 (Fig. 2) across its upper surface, said groove being adapted to receive a steam-inlet pipe 13 and being locally enlarged to accommodate a collar or lug 14 secured to said pipe and a stud 15 projecting from said collar, said collar and stud thus being adapted to prevent said pipe from sliding or turning in said groove.

The inlet pipe 13 extends through the valve stem hole in the wall of an inner tube 16 lying within the mold-section 10 and has an L-bent end portion 17 within said tube, said end portion substantially coinciding with the longitudinal axis of the tube. Said end portion 17 is provided at its extremity with an internally threaded enlargement 18, into which is screwed an inner-tube inflating-valve stem or casing 19, which is thus held in a tangential or coaxial position with respect to the tube.

The upper mold section, 20 (Fig. 1), is formed with a projection 21 extending from its inner periphery and so formed as to fit the projection 11 of the lower mold section and the pipe 13 and collar 14 mounted therein. 22 (Fig. 1) indicates the continuation of the registering flange of the lower mold section across the projection 11, the projection 21 of the upper mold section being formed with a complementary groove to receive said flange.

At a point preferably diametrically opposite the projection 11, the lower mold section 10 is traversed by a groove 23, across its lower face, accommodating a fluid-pressure pipe 24 detachably connected with the inlet pipe 13 by a coupling 25, and at its other end detachably joined, by a coupling 26 (Fig. 1), with a flexible fluid-conduit 27 branching from a steam supply-line 28. I do not wholly limit my claims, however, to this specific means for conducting steam or other pressure fluid to the inlet pipe 13, or to a direct pipe connection with said inlet pipe.

The several assembled mold sections 10, 20, may be used in different types of presses. They are here shown mounted in a press of the hot-plate type comprising a fixed top plate 29 under the upper cross-head or platen of the press, a bottom plate 30 mounted on the head 31 of a hydraulic ram 32, said head constituting the movable platen of the press, and intervening plates 33, 33 slidably mounted between the tie-rods 34, 34 of the press. 35 is a steam supply-line from which a branch pipe 36 leads to the fixed upper plate, and flexible pipes 37, 37 lead to the other plates, for heating the respective plates. The usual discharge pipes for said plates (not here shown) may be provided. 38, 38 are horizontal bars having their ends mounted in the vertical tie-rods 34 and adapted to support the intermediate plates 33 in spaced relation when the ram 32 is lowered to permit the insertion or removal of the molds.

In practicing my method with the improved apparatus here shown, the inner tube 16 is formed in any known or approved manner and assembled with the tubular valve-stem or casing 19, inside thereof, and the inlet pipe 13, the latter extending through the valve-stem hole of the tube. This may be done by first forming the rubber tube straight, inserting in the valve-stem hole thereof the inlet pipe 13, placing the valve-stem 19 within the tube and screwing it into the enlargement 18 of the inlet pipe 13, and then joining the ends of the tube.

The tube is then placed in the lower mold section 10 and the inlet pipe 13 is mounted in the groove 12 of the mold-section's projection 11, the stud 15 on the collar 14 assuring that the valve-stem 19 will lie in a tangential position and substantially in the middle of the mold cavity. The pipe 24, disconnected from the flexible pipe 27, may have remained connected with the pipe 13 from the last operation, or if previously disconnected from said inlet pipe 13 it may now be joined therewith. The upper mold section 20 is then placed in position on the lower mold section, the mold, or a plurality of molds, inserted in the press, the pipe or pipes 24 connected with the pipe or pipes 27, and the press closed. Hot pressure fluid, preferably steam, is then injected into the interior of the tube 16 from the supply line 28, expanding the tube against the walls of the mold. The tube is thus vulcanized by the application of heat directly to its inner surface as well as from the adjacent hot plates, through the mold sections, to its outer surface.

Due to the tangential position of the valve stem 19, through which the heating fluid enters the tube, direct impingement of a jet against the wall of the tube, and consequent local over-curing of the latter, is avoided, and as the jet is tangential it sets up a rapid longitudinal circulation of fluid through the tube, so that parts of the latter diametrically opposite the point of injection are heated substantially as quickly as those at the point of injection. A uniform cure is thus obtained, while time is saved by the direct application of heat to the interior of the tube.

After the vulcanization is complete, the coupling 26 is disconnected, the mold removed, the press opened, and the valve-stem 19 is drawn through the wall of the tube to its final radial position by means of the inlet-pipe 13. The latter is then disconnected from the valve stem, and the bead-spreader lug 39 and retaining nut 40 therefor are mounted on said stem in their usual relation, as shown in Fig. 3.

My invention is not limited to the specific construction shown or the exact course of procedure described, except as defined in the appended claims. It may also be used for vulcanizing other annular hollow rubber articles, such as bicycle tires.

I claim:

1. The method of vulcanizing an annular rubber tube which comprises enclosing said tube in a mold and pressing it against the walls thereof by a hot pressure fluid injected tangentially at a point remote from the wall of the tube, said fluid being injected in one tangential direction only, so as to cause a complete circumferential circulation of said fluid in said tube.

2. The method of vulcanizing annular rubber tubes which comprises injecting steam into the tube tangentially thereof at the central region of the cross-section thereof, and in one tangential direction only.

3. The method of vulcanizing an annular inflatable article such as a pneumatic tire or inner tube, said method comprising enclosing the inflating-valve casing in the tube, attaching a supply-pipe thereto and positioning the valve-casing tangentially, enclosing the tube in a vulcanizing mold, injecting steam tangentially through said valve casing until the tube is vulcanized, and finally fixing the valve casing radially in the tube wall.

4. Tube-vulcanizing apparatus comprising an annular tube-mold, and means for injecting a heating fluid tangentially thereinto in one tangential direction only at a point remote from the wall of the tube.

5. Tube vulcanizing apparatus comprising an annular tube-mold, and a fluid inlet-conduit having a portion extending substantially radially through the inner peripheral wall of the mold, and an inner terminal portion directed tangentially of the mold and in one tangential direction only and located in the central region of the cross-section of the mold.

6. In tube-vulcanizing apparatus, the combination of an annular tube-mold, and an angular conduit having a portion passing through the inner peripheral wall of the mold and a tangential portion within the mold, threaded to receive the inlet end of an inflating-valve casing.

7. In tube-vulcanizing apparatus, the combination of a lower annular mold member traversed by a substantially radial groove, an upper annular mold section formed with a groove registrable with that of the lower mold section, and an angular pipe having a substantially radial portion occupying said grooves and an inner, tangential, terminal portion threaded to receive the inlet end of the inflating-valve casing.

In witness whereof I have hereunto set my hand this 10th day of February, 1922.

ABRAM E. FALOR.